United States Patent
Inoue et al.

(10) Patent No.: US 8,077,239 B2
(45) Date of Patent: Dec. 13, 2011

(54) SOLID-STATE IMAGE PICKUP DEVICE AND CAMERA

(75) Inventors: Shunsuke Inoue, Yokohama (JP); Shin Kikuchi, Isehara (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/718,257

(22) Filed: Mar. 5, 2010

(65) Prior Publication Data

US 2010/0157124 A1 Jun. 24, 2010

Related U.S. Application Data

(62) Division of application No. 11/130,160, filed on May 17, 2005, now Pat. No. 7,714,919.

(30) Foreign Application Priority Data

May 20, 2004 (JP) .................................. 2004-150538

(51) Int. Cl.
*H04N 3/14* (2006.01)
*H04N 5/225* (2006.01)
*H04N 5/235* (2006.01)
*H04N 5/217* (2011.01)

(52) U.S. Cl. ..................... 348/300; 348/241; 348/220.1; 348/229.1

(58) Field of Classification Search .................. 348/241, 348/220.1, 221.1, 229.1, 243, 248, 300, 301
See application file for complete search history.

(56) References Cited

U.S. PATENT DOCUMENTS

| | | | |
|---|---|---|---|
| 4,603,354 A | 7/1986 | Hashimoto et al. | |
| 5,698,844 A * | 12/1997 | Shinohara et al. | 348/300 |
| 5,909,026 A | 6/1999 | Zhou et al. | |
| 5,949,483 A | 9/1999 | Fossum et al. | |
| 6,185,274 B1 | 2/2001 | Kinno et al. | |
| 6,661,451 B1 | 12/2003 | Kijima et al. | |
| 7,692,704 B2 * | 4/2010 | Hashimoto et al. | 348/302 |
| 7,714,919 B2 | 5/2010 | Inoue et al. | |
| 2002/0134918 A1 * | 9/2002 | Miida | 250/214.1 |

(Continued)

FOREIGN PATENT DOCUMENTS

| | | |
|---|---|---|
| EP | 0 964 584 | 12/1999 |
| JP | 63-99681 | 4/1988 |
| JP | 2-65380 | 3/1990 |

(Continued)

OTHER PUBLICATIONS

Partial Translation of JP 63-99681.

(Continued)

*Primary Examiner* — Nhan T Tran
(74) *Attorney, Agent, or Firm* — Fitzpatrick, Cella, Harper & Scinto

(57) ABSTRACT

A solid-state image pickup device which has means of adding signals from plural pixels, which achieves a high S/N and a pickup device suitable for both static and moving image pickup. The device has a pixel unit having plural pixels arranged two-dimensionally and outputting pixel signals derived by photoelectric conversion, and has a first mode reading a pixel signal every pixel, and a second mode adding and reading a plurality of pixel signals, having a variable gain column amplifier for performing readout at different gains in the first mode and second mode. The device has plural output lines where signals from plural pixels arranged in one line are outputted respectively, and at least one amplifier is connected to each of the plurality of output lines. Gain at time of second mode readout is higher than gain at time of first mode readout.

6 Claims, 9 Drawing Sheets

U.S. PATENT DOCUMENTS

| | | | |
|---|---|---|---|
| 2003/0034918 A1 | 2/2003 | Werner et al. | |
| 2004/0008813 A1* | 1/2004 | Endo | 378/62 |
| 2004/0165088 A1* | 8/2004 | Barna et al. | 348/241 |
| 2005/0052552 A1 | 3/2005 | Hashimoto | |
| 2005/0259167 A1 | 11/2005 | Inoue et al. | |
| 2005/0270392 A1 | 12/2005 | Kikuchi | |
| 2005/0270393 A1 | 12/2005 | Noda et al. | |

FOREIGN PATENT DOCUMENTS

| | | |
|---|---|---|
| JP | 9-247535 | 9/1997 |
| JP | 11-331703 | 11/1999 |
| JP | 2000-078373 | 3/2000 |
| JP | 2003-18469 | 1/2003 |
| JP | 2003-051989 | 2/2003 |

OTHER PUBLICATIONS

Partial Translation of JP 2003-18469.

Tanaka, et al., "A 310K Pixel Bipolar Imager (BASIS)", IEEE Transactions on Electron Devices, vol. 37, No. 4, pp. 964-971 (Apr. 1990).

Yusa, et al., "SIT Image Sensor: Design Considerations and Characteristics", IEEE Transactions on Electron Devices, vol. ED-33, No. 6, pp. 735-742 (Jun. 1986).

Nakamura, et al., "Gate Accumulation Type MOS Phototransistor Image Sensor," Proceedings of ITE, vol. 41, No. 11, pp. 1075-1082 (Nov. 1987).

English-language translation of Japanese Laid-Open Patent Application No. 2000-078373.

* cited by examiner

US 8,077,239 B2

SOLID-STATE IMAGE PICKUP DEVICE AND CAMERA

This application is a division of Application Ser. No. 11/130,160 filed May 17, 2005, U.S. Pat. No. 7,714,919 B2.

BACKGROUND OF THE INVENTION

1. Field of the Invention

The present invention relates to a solid-state image pickup device and an image pickup system, and in particular, to a CMOS type solid-state image pickup device and a camera, which are adapted for both static image pickup and moving image pickup.

2. Description of the Related Art

In recent years, with being characterized in that a CMOS type solid-state image pickup device is low in power consumption and easy to be accelerated in comparison with a CCD (Charge Coupled Device), the CMOS type solid-state image pickup device begins to spread quickly as an image sensor for a portable device, or for a single-lens reflex camera which perform high-speed rapid shooting.

In order for a CMOS type solid-state image pickup device to spread further, the engineering development which can perform still image pickup and moving image pickup in high definition is required.

Heretofore, in a MOS type solid-state image pickup device, a method of performing high-definition static image pickup and moving image pickup using analog memory cell provided in an image pickup device is described in Japanese Patent Application Laid-Open No. H02-65380 which is a Japanese patent. According to this invention, in the MOS type solid-state image pickup device, the following disclosure is performed as a method of suppressing the blurring of an image which the time difference of image pickup between an even number field and an odd number field generates. Analog memory cell besides a pixel unit is provided, and a signal obtained by photoelectric conversion in the pixel unit is once transferred per line to memory means. Then, after that, the timing difference of charge storage between the odd number field and even number field is made small by transferring a store signal of the memory means concerned by turns to an output signal line. In this invention, memory is used in order to enhance image quality at the time of still image pickup, and memory has the number of bits corresponding to full pixels. On the other hand, it is made that moving image pickup is performed at a video rate without going through memory.

It becomes hard to perform readout at the video rate at the time of moving image pickup as the pixel count of a still image increases. For example, supposing the pixel count of 3 million pixels or more is necessary in high-definition static image pickup, it is necessary to perform readout at speed of 90 MHz so as to perform readout at intervals of 1/30 sec. Then, a method of reducing the pixel count of moving images with the pixel count of a still image being maintained has been studied. One method of them is pixel addition, that is, a method of adding a plurality of photoelectric conversion signals, and decreasing the pixel count to be read.

An example of the pixel addition method in a CMOS type solid-state image pickup device is described in Japanese Patent Application Laid-Open No. H09-247535 which is a Japanese patent. What is described in this invention is a method of the memory consisting of a switching device and a capacitive element for every readout line from pixels is provided for multiple lines, and outputting an average of a plurality of stored signals by turning on concurrently switching devices of a plurality of stored signals to be added. In this way, in the CMOS type solid-state image pickup device, "pixel addition" is equivalent to "pixel averaging." In this invention, an effect of decreasing random noise by averaging read signals after reading the same pixel signal multiple times is described. By using the same structure, it becomes possible to read the signal in the pixel count, which is smaller than the case that an unnecessary signal is skipped by averaging other pixel signals, in low random noise and low fixed pattern noise. Owing to this method, in comparison with the case of no addition, both of the random noise and fixed pattern noise become:

$1/\sqrt{\text{(added pixel count)}}$

For example, when the addition of 2×2=4 pixels is performed, random noise and fixed pattern noise becomes:

$1/\sqrt{4}=1/2$ in comparison with the former noise.

In addition, a solid-state image pickup device which is provided with an amplifier with a gain exceeding 1 in each column is disclosed in Japanese Patent Application No. 2003-51989 which is a Japanese patent.

In view of the above-mentioned conventional examples, what is conceivable is the structure of reading only the pixel count necessary for using addition means when the pixel count increases in an image pickup apparatus where analog memory cell is mounted. In that case, the following subjects arise in extension of conventional inventions.

(1) When the pixel count increases, the readout through memory becomes more important in moving images rather than in a still image. In moving images, there also exist restrictions of formats in an output device, and large pixel count is unnecessary. The new structure that a still image and moving images are imaged in high definition with a mega-pixel-class image pickup apparatus is necessary.

(2) Since the pixel addition, that is, the averaged readout makes the random noise of pixels small, an S/N improves. Nevertheless, in CCD technology, not only random noise becomes small, but also a signal component becomes large. Thus, in the CCD, a charge number is added by add operation and a value of an S of the S/N also becomes large. Owing to this, in consideration of a CCD, new means of improving the S/N in the readout method of adopting the add operation is demanded in a CMOS type solid-state image pickup device.

SUMMARY OF THE INVENTION

In order to solve the above-mentioned subjects, a solid-state image pickup device of the present invention is a solid-state image pickup device which has a plurality of pixels which are arranged two-dimensionally and output pixel signals derived by a photoelectric conversion, and an output line which outputs an output signal per the plurality of above-mentioned pixels arranged in one line, and is provided with a first mode of reading the above-mentioned output signal every pixel, and a second mode of adding and reading the output signals from the plurality of pixels, wherein a gain at the time of readout in the above-mentioned second mode is made to be higher than a gain at the time of readout in the above-mentioned first mode by variable gain amplifying means at least one of which is connected to each of the plurality of above-mentioned output lines.

In the above-mentioned solid-state image pickup device of the present invention, it is desirable to have analog memory cell which keeps a signal after addition during one frame, to make a gain at the time of performing readout in a mode of adding and reading pixel signals higher than a gain at the time of reading a pixel signal in a mode of directly reading, to have a plurality of output lines where output signals from a plurality of pixels arranged in one line are outputted respectively, and to connect at least one of the above-mentioned variable gain amplifying means to each of the plurality of above-mentioned output lines, or to make a mode of reading a signal directly an operation mode of readout of a still image and to make a mode of adding and reading a plurality of signals a mode of readout of moving images.

A reason why the S/N and dynamic range in both modes can be optimized by performing switching so that the gain in the mode of addition may become higher in the mode of adding the plurality of pixel signals and the mode of no addition (mode of reading a signal per pixel) will be explained below.

FIG. 7 is a model diagram for calculating the S/N of a circuit reading from a pixel unit. Let a light signal from the pixel unit be S1, let a noise signal of the pixel unit be N1, let a gain of gain means be G, and let the noise of a subsequent stage of circuit be N2, and each of the light signal S and noise signal N of an output signal is:

$$S = G \cdot S1$$

$$N = G \cdot N1 + N2$$

Hence, $S/N = G \cdot S/(G \cdot N1 + N2) = S/(N1 + (N2/G))$

From this formula, the S/N approaches S/N1 as G is enlarged. When N1 is small than N2, an effect of enlarging G is large. On the other hand, since a large voltage signal is generated by the same light signal when G is enlarged, a dynamic range is suppressed. Making the S/N high and securing a dynamic range has the relationship of trade-off.

Then, in the image pickup that exposure time is controllable and sufficient light amount is obtained, for example like a still image, an image is read at a relatively low gain so as to secure a dynamic range. In the image pickup that sufficient light amount is not obtained, that is, moving images or a still image in a dark environment, a method of reading them or it at a relatively high gain is effective so as to secure the S/N.

In this way, it is possible to obtain an image pickup apparatus which obtains high image quality in both of static image pickup and moving image pickup by applying readout gains which are different at the time of addition readout and at the time of normal readout.

In addition, at the time of moving image pickup, an output signal obtained by addition is transferred at high speed, and is made to be accumulated in analog memory cell. It is appropriate that the number of bits of the analog memory cell is equal to the pixel count necessary for moving images. It is possible to suppress the increase of a chip area because of mounting memory to a minimum by preparing only necessary analog memory cell.

It is possible to apply a gain directly to a signal of a pixel unit by adopting the structure of one gain means being provided per line corresponding to a readout line, a so-called column amplifier, and hence, it is possible to suppress the noise N2 in the subsequent stage which is shown in the formula shown above.

According to the present invention, it becomes possible to provide a solid-state image pickup device which can perform image pickup at the higher S/N under an environment such as low illuminance at the time of pixel addition, and can perform image pickup at the high S/N with a wide dynamic range under a comparatively high illuminance usually (at the time of no pixel addition), compatibly.

In addition, it is possible to provide a solid-state image pickup device suitable for both static image pickup and moving image pickup by using the pixel addition mode at the time of moving image pickup or at the time of relatively low illuminance image pickup, and using the normal mode for image pickup in a still image mode.

DESCRIPTION OF THE PREFERRED EMBODIMENTS

Hereafter, embodiments of the present invention will be explained in detail using drawings.

Embodiment 1

Figure 1:
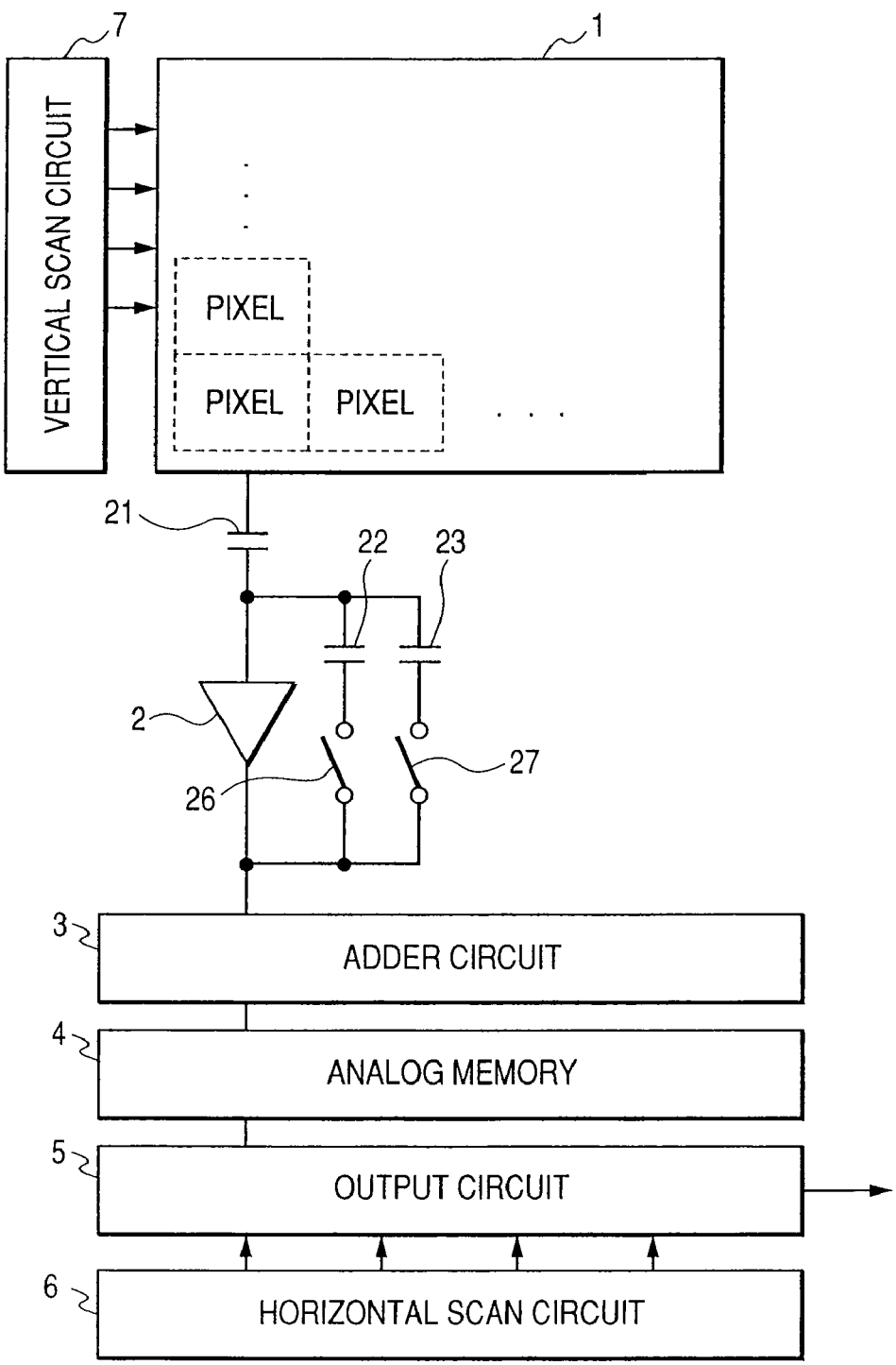
FIG. 1 is a configuration block diagram of a solid-state image pickup device of a first embodiment of the present invention.

FIG. 1 is a block diagram of a solid-state image pickup device of a first embodiment of the present invention. A pixel output signal outputted from each output line of a pixel array 1 located two-dimensionally is amplified at a suitable gain by a variable gain column amplifier 2 used as variable gain amplifying means. An input capacitor 21 not only plays the role of clamping noise in a dark environment, but also plays the role of determining a gain by a capacitance ratio between feedback capacitors 22 and 23. An output terminal and input terminal of the variable gain column amplifier 2 are not only connected through the feedback capacitor 22 and a switch 26, but also connected through the feedback capacitor 23 and a switch 27. It is possible to select a gain by switching the switches 26 and 27.

Clamping operation by the input capacitor 21 sets an input side of a differential amplifier 25 of the input capacitor 21 at a reference voltage of a reference voltage input 24 by turning on a switch 28. In the state, a transistor 204 for resetting resets a gate electrode of an amplifying transistor 203 of a pixel shown in FIG. 2 at predetermined electric potential, and noise from the pixel is inputted into the input capacitor 21. Then, the switch 28 is turned off, the input side of the differential amplifier 25 of the input capacitor 21 is made to float, a light signal is sent to the gate electrode of the amplifying transistor 203 through a charge transfer transistor 202 from a photodiode 201 in a pixel, and the amplified signal is inputted from the pixel into the input capacitor 21. The amount of electric potential change of the input terminal of the input capacitor 21 becomes the amount obtained by removing a noise component from the signal, and the signal that the noise is reduced is made to be inputted into the variable gain column amplifier 2.

A switching signal of gains can be generated by a timing generator inside a sensor, and further, can be also generated from a camera system or a video system. Generally, it is preferable to transmit a mode switching signal from a communication terminal of a camera system or a video system and to control a sensor directly or through a timing generator. Although a user switches gains with a switch or the like generally, it is also possible to detect a motion of an object and to perform switching, for example, in an application of a surveillance camera or the like. With explaining a still camera shown in FIG. 8 described later as an example, a gain switching command signal is sent with a switch, not shown, to a controlling unit 109 for controlling whole and arithmetic operation. Then, a gain switch signal is sent to the switches 26 and 27 of a solid-state image pickup element (solid-state image pickup device) from a timing generator 108.

After passing through the variable gain column amplifier 2, the signal is inputted into a signal adder circuit 3 as required. Plural columns of signal lines are inputted into input terminals of the signal adder circuit 3 according to the pixel count added in a column direction. In the signal adder circuit 3, the readout (readout without addition) per pixel and the addition readout in the plurality of pixel signals are switched. In addition, the signal adder circuit 3 is constituted of a plurality of capacitance means and a plurality of switches. The signal passing through the signal adder circuit 3 is stored in analog memory cell 4 as required. The number of bits of the analog memory cell may be equal to the number of signals after addition. For example, in the embodiment, it is made that full effective pixel count is 3,200,000 pixels, and analog memory cell is for 800,000 pixels. Thus, in the signal adder circuit, the signals for 4 pixels are added to make one output signal. The signal which passes through the memory 4 is outputted out of a chip from an output circuit 5 which is constituted of a horizontal output line and differential amplifier circuits. The differential amplifier circuits are effective in removing the offset dispersion among a plurality of variable gain column amplifiers 2. In addition, a horizontal scan circuit 6 which scans horizontally the pixel unit 1, signal adder circuit 3, analog memory cell 4, and output circuit 5, a vertical scan circuit 7 which scans the pixel unit 1 vertically, and the like are located besides these in the chip.

Figure 2:
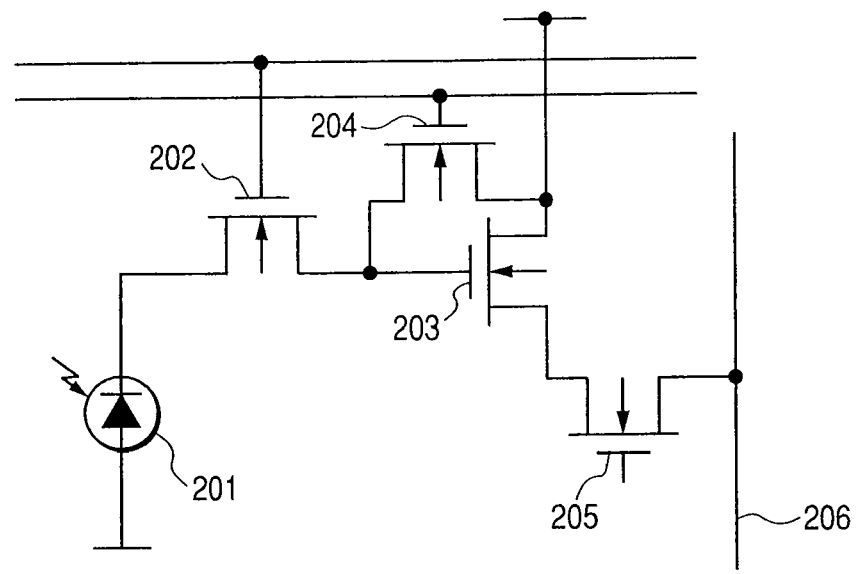
FIG. 2 is a diagram showing a pixel circuit of the solid-state image pickup device of the above-mentioned first embodiment.

FIG. 2 is a unit pixel circuit diagram of the pixel unit 1. The light signal which is given photoelectric conversion by the photodiode 201 is transferred to the gate electrode of the amplifying transistor 203 by the charge transfer transistor 202. A pixel selected by a selecting transistor 205 outputs output potential according to the gate potential of the amplifying transistor to a signal output line 206. The gate electrode of the amplifying transistor 203 is reset at the predetermined electric potential by the transistor 204 for resetting. Although the pixel explained here is what is called a CMOS sensor, the pixel is not limit to the CMOS sensor especially, but a VMIS (Threshold Voltage Modulation Image Sensor), a BCAST (Buried Charge Accumulator and Sensing Transistor array), an LBCAST (Lateral Buried Charge Accumulator and Sensing Transistor array) or the like is applicable. In particular, as for the BCAST and LBCAST, it is possible to achieve the replacement without being accompanied by essential modification by replacing JFET transistors with the amplifying MOS transistors. In addition, it is possible to use a type of sensor of leading signal charges accumulated in a photoelectric conversion unit to a control electrode of a transistor with which a pixel is provided, and outputting an amplified signal from a main electrode, for the pixel of this embodiment. Its examples are a SIT type image sensor using a SIT as the amplifying transistor (A. Yusa, J. Nishizawa et al., "SIT image sensor: Design consideration and characteristic," IEEE trans. Vol. ED-33, pp. 735-742, June 1986), a BASIS using a bipolar transistor (N. Tanaka et al., "A 310 K pixel bipolar imager (BASIS))," IEEE Trans. Electron Devices, vol. 35, pp. 646-652, May 1990), a CMD using a JFET which a control electrode is depleted (Nakamura et. al., "Gate accumulation type MOS phototransistor image sensor," Proceedings of ITE, 41, 11, pp. 1075-1082, November 1987), and the like.

Figure 3:
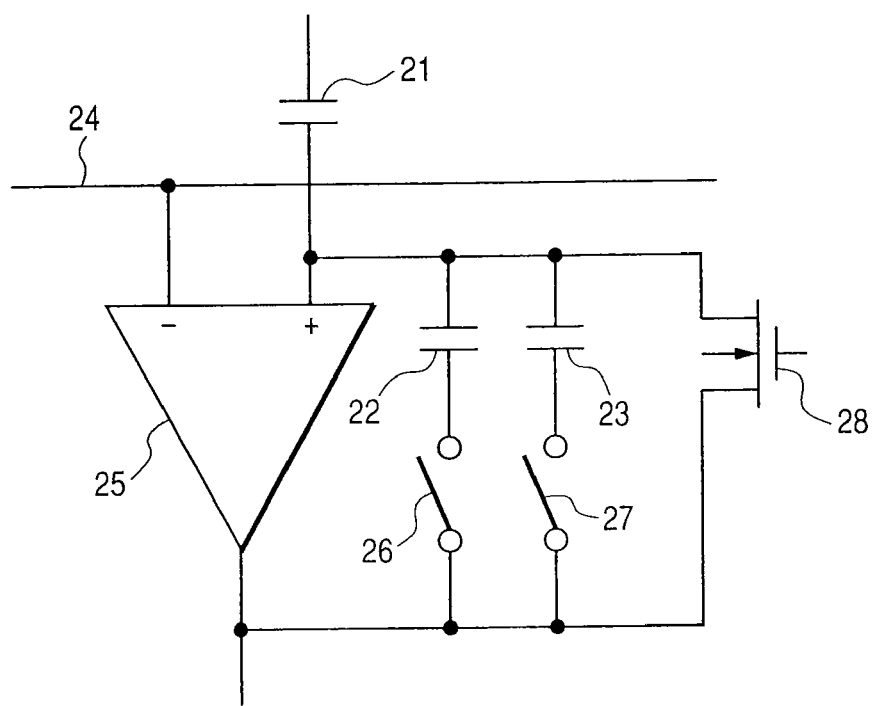
FIG. 3 is a circuit diagram of a variable gain column amplifier of the solid-state image pickup device of the above-mentioned first embodiment.
Figure 10:
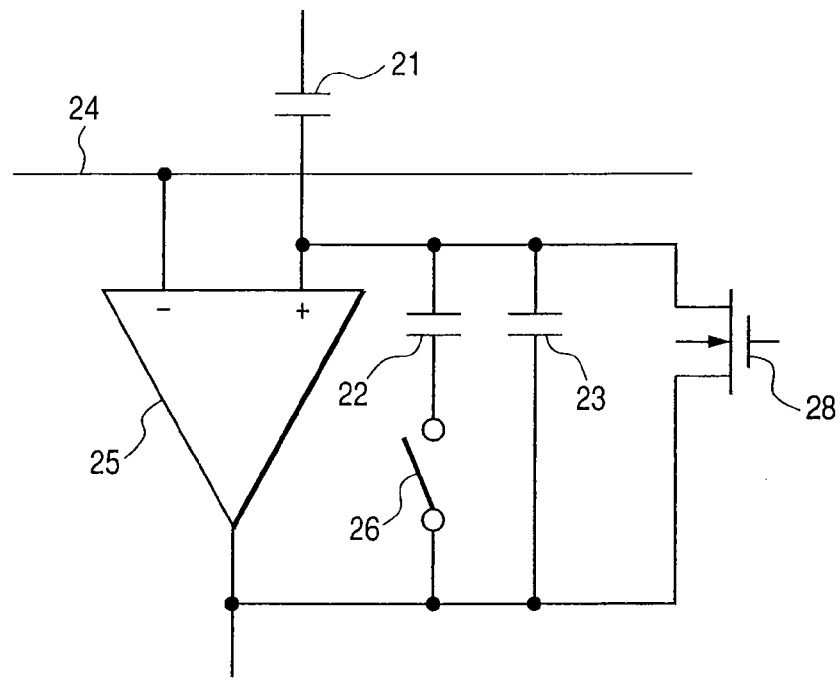
FIG. 10 is a circuit diagram of another variable gain column amplifier of the solid-state image pickup device of the above-mentioned first embodiment.

FIG. 3 is a diagram showing an example of the variable gain column amplifier circuit. An output signal from a pixel is clamped by the input capacitor 21, and becomes a differential input of the differential amplifier 25 with the reference voltage input 24. The mode selection switch 26 is located in series to the feedback capacitor 22 for a low gain and the mode selection switch 27 is located in series to the feedback capacitor 23 for a high gain, and a gain of the differential amplifier 25 is selected by either being turned on. In addition, the reset switch 28 which triggers a reset by making the input and output of the amplifier into the same potential is located in parallel to the feedback capacitors 22 and 23. Although the mode selection switches are provided in series to respective feedback capacitors, it is also possible to perform such design that the switch 27 in series to the feedback capacitor 23 used in a high gain mode is omitted and the sum of two feedback capacitors 22 and 23 may become desired capacitance at the time of a low gain as shown in FIG. 10. Thus, in the "high gain mode", the switch 26 in series to the capacitor 22 is turned off. At this time, the gain becomes a value calculated in the formula of (capacitance of capacitor 21/capacitance of capacitor 23). The switch 26 is turned on in the "low gain mode." At this time, the gain becomes a value calculated in the formula of (capacitance of capacitor 21/(capacitance of capacitor 22+capacitance of capacitor 23)). It is possible to perform the gain design of the "high gain mode" and "low gain mode" by designing the capacitor 22 and capacitor 23. This method can make an area of full capacitative elements small. In addition, it is possible to provide, for example, three or more capacitors and switches, and to have three or more modes. The third mode can be used as a super-high gain mode at the time of moving images, or a super-high gain mode at the time of static image pickup at a dark place. Although a feedback type amplifier is used as the variable gain column amplifier here, a feedback type amplifier using a capacitor is preferable as the feedback type amplifier. For example, in a feedback type amplifier using a resistor, when resistance is small, a current value becomes large and consumed power becomes large, and when resistance is large, not only noise becomes large, but also response deteriorates. When this point is taken into consideration, the feedback type amplifier using a capacitor is more preferable.

Figure 4:
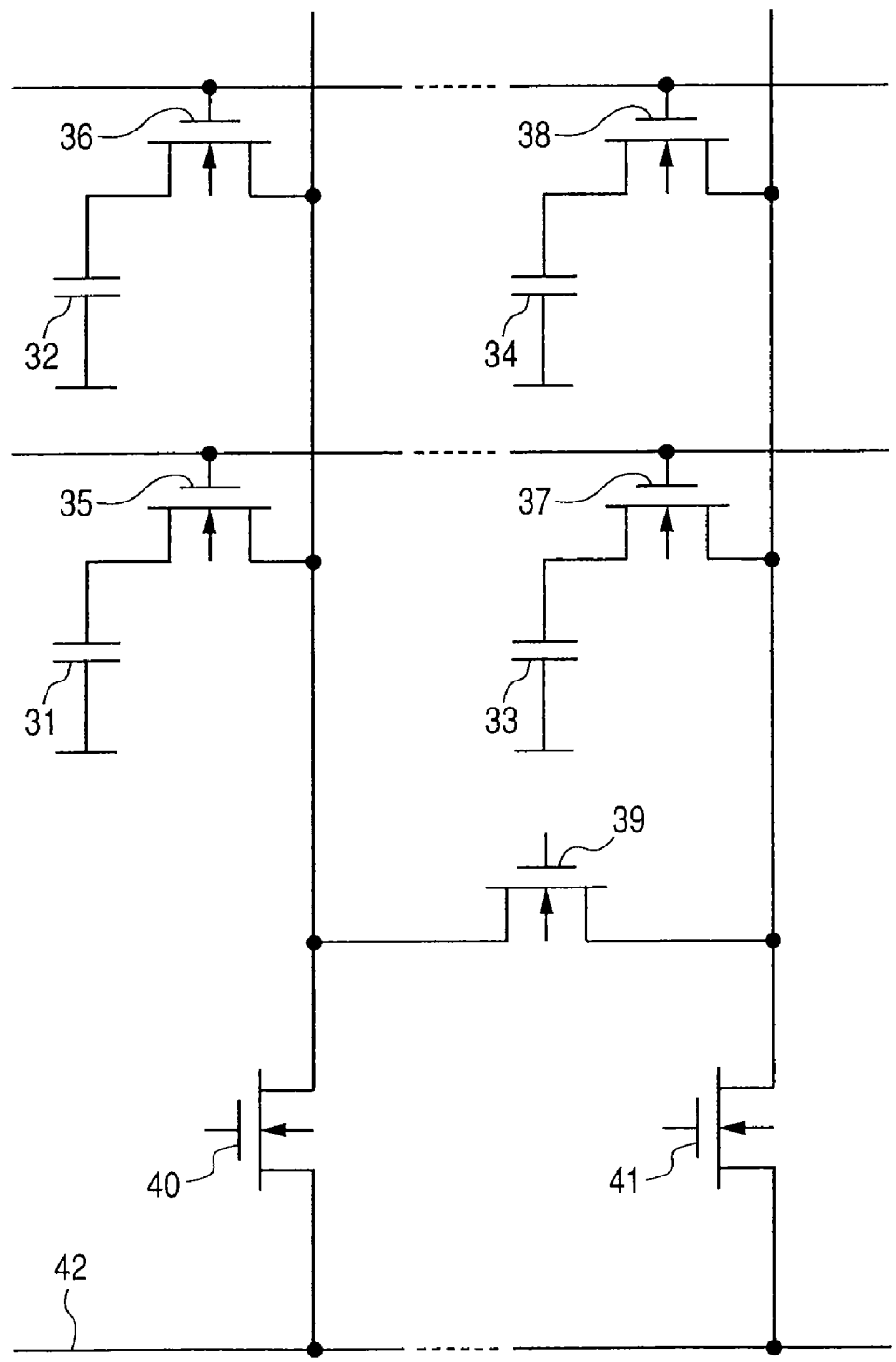
FIG. 4 is an adder circuit diagram of the solid-state image pickup device of the above-mentioned first embodiment.

FIG. 4 is a circuit diagram showing an example of the signal adder circuit 3. Since two pixels are added respectively in both of a column direction and a row direction in this embodiment, capacitative elements 31, 32, 33 and 34 and switching devices 35, 36, 37 and 38 for two pixels of each column are provided. Switches 40 and 41 are switched outputting signals of respective columns, and a switch 39 is an addition readout switch which short-circuits between adjacent columns. At the time of addition readout, the switch 39 and switch 40 are turned ON and the switch 41 is turned OFF, and in the readout without addition, the switches 40 and 41 are turned ON and the switch 39 is turned OFF. Since signals in the same color are added in color image pickup, "two pixels in a column direction" and "two pixels in a row direction" are to add adjacent signals every one column or every one row in a color filter with a normal Bayer color array.

Figure 5:
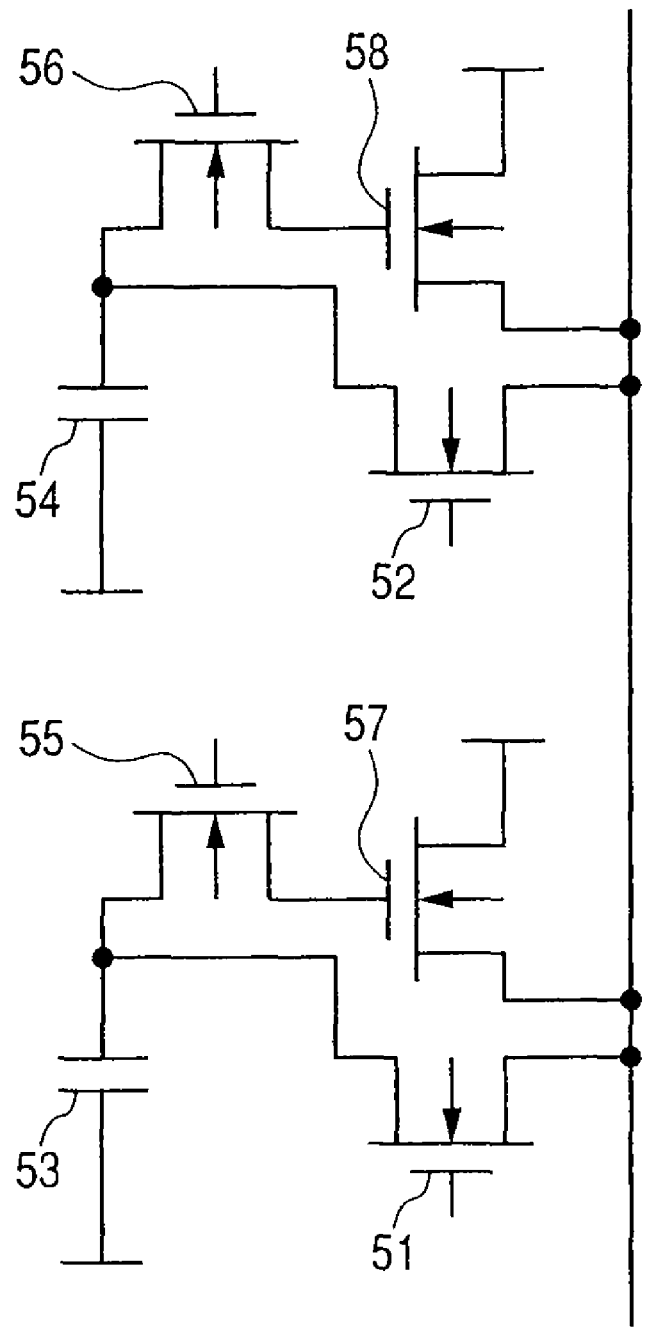
FIG. 5 is a circuit diagram of an analog memory cell unit of the solid-state image pickup device of the above-mentioned first embodiment.

FIG. 5 is a detail drawing of the analog memory cell 4. This diagram shows a circuit for 2 bits. The signals passing through the adder circuit are written in the memory capacitors 53 and 54 through memory write switches 51 and 52. Through the memory selecting switches 55 and 56, the written signals are detected as the change of gate potential of memory amplifying transistors 57 and 58, and are outputted.

Figure 11:
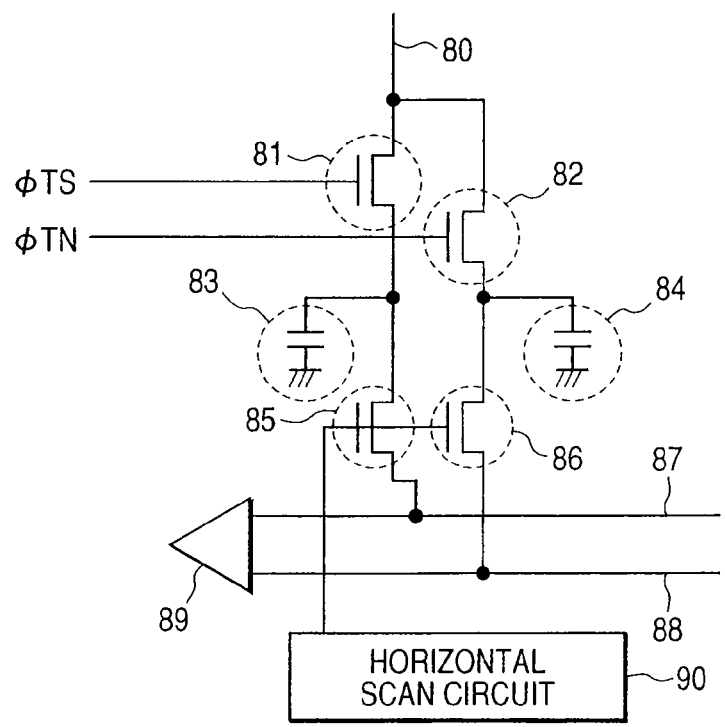
FIG. 11 is a diagram showing the structure of an example of an output circuit 5 in FIG. 1.

FIG. 11 is a diagram showing the structure of an example of the output circuit 5. Signal readout from a memory cell of the analog memory cell 4 (here, signal readout from one pixel in FIG. 5 will be explained) is performed by making the transistor 56 turned on. An output of the selected memory cell is read in a vertical memory output line 80, and is sampled by a storage capacitor 83 through a switching transistor 81. Next, an inversed input terminal and an output terminal of a column amplifier are short-circuited, and an offset of the variable gain column amplifier 2 is written in a memory cell. The readout and sampling of the offset written in the memory cell are the same as the readout and sampling of a signal written in the memory cell. The sampling of the offset output from a memory cell to the storage capacitor 84 is performed by applying a pulse φTN to a switching transistor 82. A voltage on the storage capacitor 83 includes an offset of the amplifying transistor 58 in addition to the amplified pixel signal and the offset of the variable gain column amplifier 2. A voltage on the storage capacitor 84 includes an offset of the amplifying transistor 58 in addition to the offset of the variable gain column amplifier 2.

The horizontal scan succeedingly carried out to the above-mentioned operation is performed by a horizontal scan circuit 90. The horizontal scan circuit 90 scans the transistor 85 and transistor 86 which are a switch pair, and transfers the voltages on the storage capacitors 83 and 84 to horizontal output lines 87 and 88, respectively. A differential amplifier 89 removes an offset between the variable gain column amplifier 2 and amplifying transistor 58, and outputs a sensor signal with a high signal-to-noise ratio.

Embodiment 2

Figure 6:
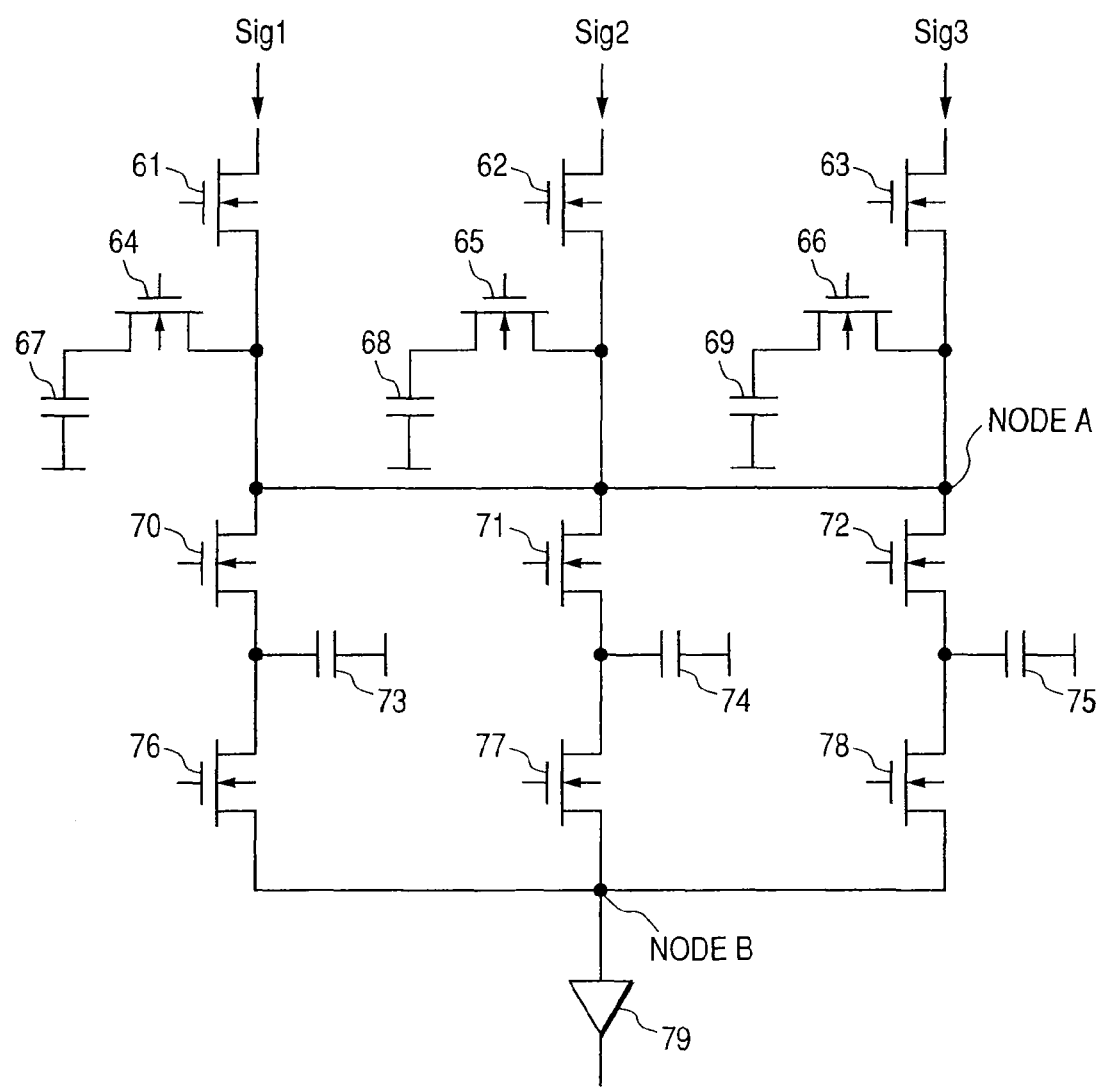
FIG. 6 is an adder circuit diagram of the solid-state image pickup device of a second embodiment of the present invention.
Figure 7:
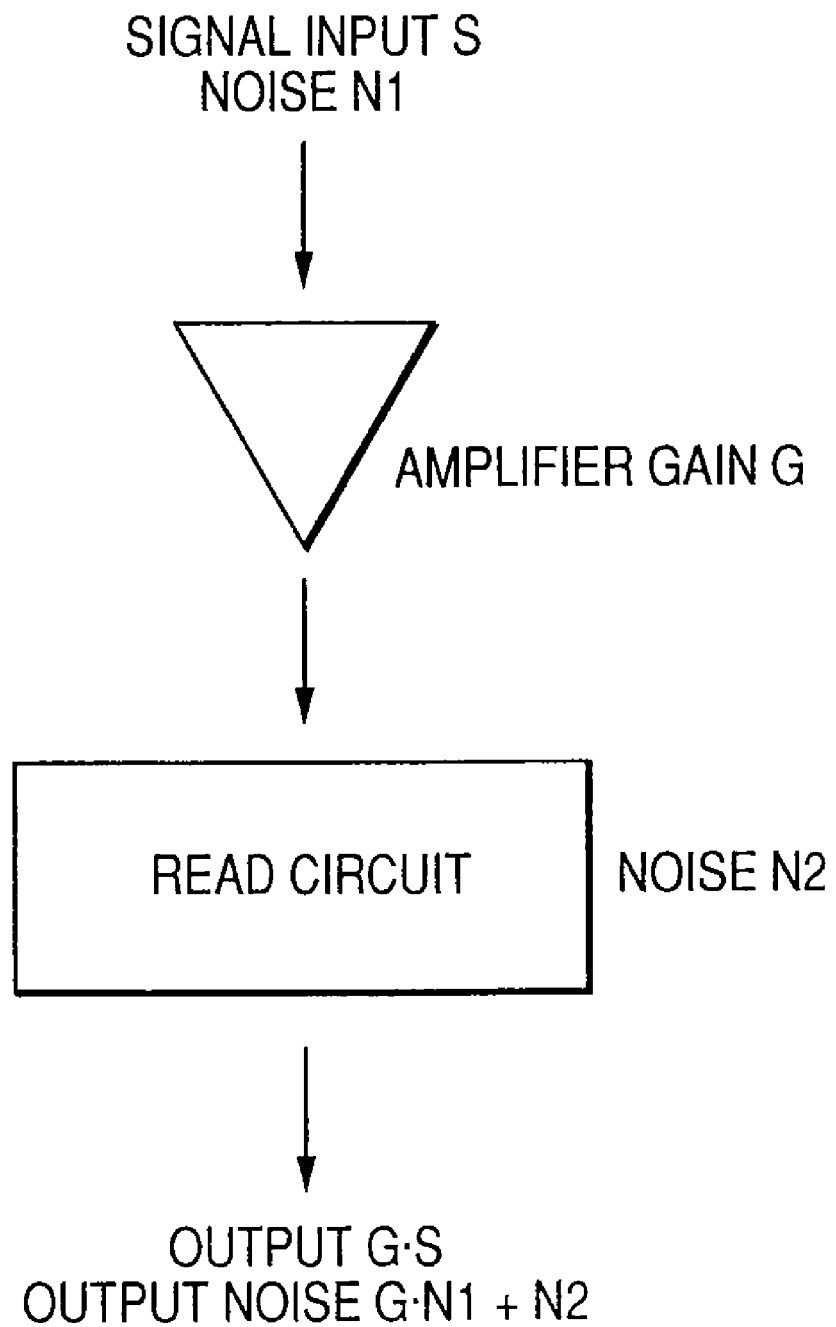
FIG. 7 is a model diagram for calculating an S/N of a readout circuit from a pixel unit.

FIG. 6 is a signal adder circuit diagram of a solid-state image pickup device of a second embodiment of the present invention. FIG. 6 shows an adder circuit diagram in the case of adding three pixels in the column direction and three pixels in the row direction in the solid-state image pickup device having the same block diagram as the first embodiment. In this embodiment, it is made that effective pixel count at the time of static image pickup is 5 million pixels and pixel count at the time of moving image pickup is 300,000 pixels, and hence, high definition still image pickup and 300,000 pixels sufficient for the moving image pickup are secured. What is adopted is such structure that 3×3=9 pixels are added in about 2,700,000 pixels in a central portion at the time of signal addition, and the remaining pixels of a peripheral portion is not used.

Similarly to the first embodiment, three columns of signals to be added are three rows every other column so that addition of the same color signals may be performed. Thus, an n-th column, an (n+2)-th column and an (n+4)-th column are added. In FIG. 6, an n-th column of signal, an (n+2)-th column of signal, and an (n+4)-th column of signal are inputted into signal inputs Sig1, Sig2, and Sig3, respectively. Assuming three lines to be added are an m-th line, an (m+2)-th line, and an (m+4)-th line, when the m-th line of signal is first inputted as signals Sig1, Sig2, and Sig3, switches 61, 62, and 63 are turned ON and switches 64, 65, and 66 are turned ON. Hence, the signal (m, n), signal (m, n+2), and signal (m, n+4) are written in retention capacitors 67, 68, and 69, respectively. Next, three signals kept at a node A are added (=equalized) by turning the switches 61, 62, and 63 OFF, and turning the switches 64, 65 and 66ON. This averaged signal is written in an added signal retention capacitor 73 by turning a switch 70ON.

Next, when the (m+2)-th line of signals are inputted as signals Sig1, Sig2 and Sig3, similarly to the m-th line of signals, a signal (m+2, n), a signal (m+2, n+2), and a signal (m+2, n+4) are kept in the retention capacitors 67, 68 and 69 respectively. Then, after the node A is added, the result is written in an added signal retention capacitor 74 by turning, on a switch 71.

Similarly, the added result of the signals (m+4, n), (m+4, n+2), and (m+4, n+4) is written in an added signal retention capacitor 75.

Then, the signals currently written in three added signal retention capacitors 73, 74 and 75 are added (=equalized) at a node B by turning switches 76, 77 and 78ON. As a result, nine pixel signals selected in a matrix of the m, m+2, and m+4 rows, and n, n+2, and n+4 columns are outputted from a source follower amplifier 79.

The same units in the first embodiment can be used as the other units in this embodiment. Just the number of bits of analog memory cell required for moving images is secured.

In addition, although the solid-state image pickup device can be provided on the same semiconductor substrate in each of the above-mentioned embodiments, the differential amplifier 33 may be provided out of the substrate lest noise generated by the differential amplifier 33 should influence other circuit members.

On the basis of FIG. 8, one embodiment in the case of applying a solid-state image pickup device relating to the present invention to a still camera (image pickup system) corresponding to moving images will be explained in detail.

Figure 8:
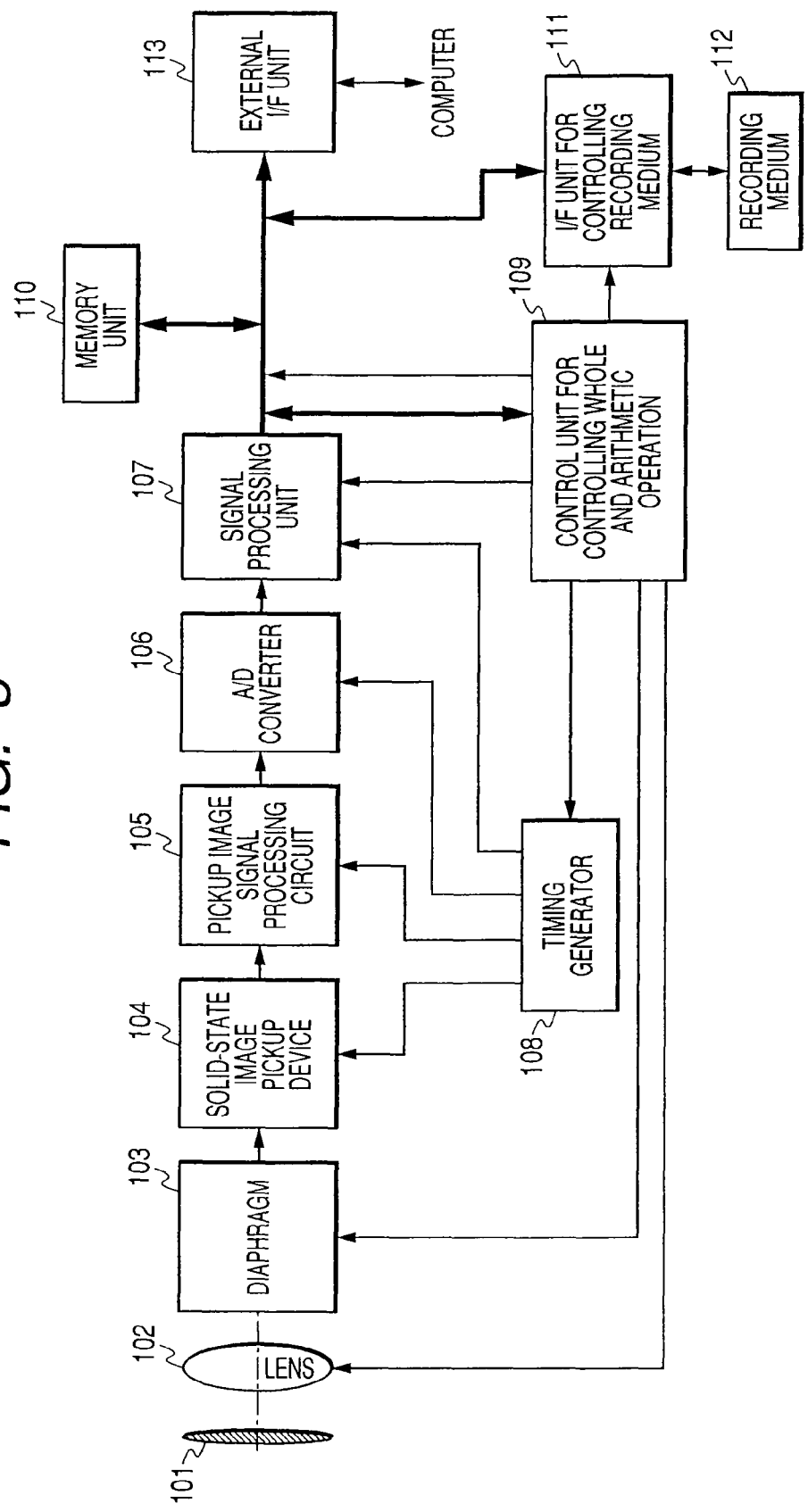
FIG. 8 is a block diagram showing the case that the solid-state image pickup device according to the present invention is applied to a still video camera corresponding to moving images.

FIG. 8 is a block diagram showing the case of applying the solid-state image pickup device according to the present invention to the "still camera" corresponding to moving images.

FIG. 8 shows a barrier 101 which serves as both of a protection of a lens and a main switch, a lens 102 which images an optical image of an object on a solid state image pickup element (solid-state image pickup device) 104, a diaphragm 103 for making the amount of light, which passes through the lens 102, variable, a solid state image pickup element 104 for fetching the object, which is imaged by the lens 102, as an image signal, an A/D converter 106 which performs the analog-to-digital conversion of the image signal outputted from the solid state image pickup element 104, a signal processing unit 107 which performs various kinds of correction to image data outputted from the A/D converter 106, or compresses data, a timing generator 108 which outputs various timing signals to the image pickup element 104, pickup image signal processing circuit 105, A/D converter 106, and signal processing unit 107, a controlling unit 109 for controlling whole and arithmetic operation which controls various calculations and the whole still video camera, a memory unit 110 for storing image data temporarily, an interface unit 111 for performing record to or readout from a recording medium, a recording medium 112 which can be detached and attached like semiconductor memory for performing the record or readout of image data, and an interface unit 113 for communicating with an external computer and the like.

Next, the operation of a still video camera at the time of image pickup in the above-mentioned structure will be explained.

When the barrier 101 is opened, main power is turned on, then, the power supply of a control system is turned on, and further, the power supply of imaging system circuits such as the A/D converter 106 is turned on.

Then, in order to control exposure, the controlling unit 109 for controlling whole and arithmetic operation makes the diaphragm 103 open, and a signal outputted from the image pickup element 104 is converted by the A/D converter 106, and thereafter, is inputted into the signal processing unit 107. The controlling unit 109 for controlling whole and arithmetic operation calculates exposure on the basis of the data.

After determining brightness with the result of this metering, the controlling unit 109 for controlling whole and arithmetic operation controls the diaphragm according to the result.

Next, the controlling unit 109 for controlling whole and arithmetic operation fetches a high frequency component on the basis of the signal outputted from the image pickup element 104, and calculates the distance to the object. Then, the controlling unit 109 determines whether it is in focus when the lens is driven, and when determining that it is not in focus, the controlling unit 109 drives the lens again and performs ranging. Then, after focusing is confirmed, actual exposure starts.

When the exposure is completed, the A/D conversion of the image signal outputted from the image pickup element 104 is performed by the A/D converter 106, and is written in the memory unit 110 through the signal processing unit 107 by the controlling unit 109 for controlling whole and arithmetic operation.

Then, the data accumulated in the memory unit 110 is recorded on the recording medium 112 such as semiconductor memory, which can be detached and attached, through the I/F unit 111 for controlling a recording medium under the control of the controlling unit 109 for controlling whole and arithmetic operation.

In addition, an image may be inputted directly into a computer or the like through the external I/F unit 113, and may be also processed.

Furthermore, on the basis of FIG. 9, an example of the case of applying a solid-state image pickup device of the present invention to a video camera will be explained in detail.

Figure 9:
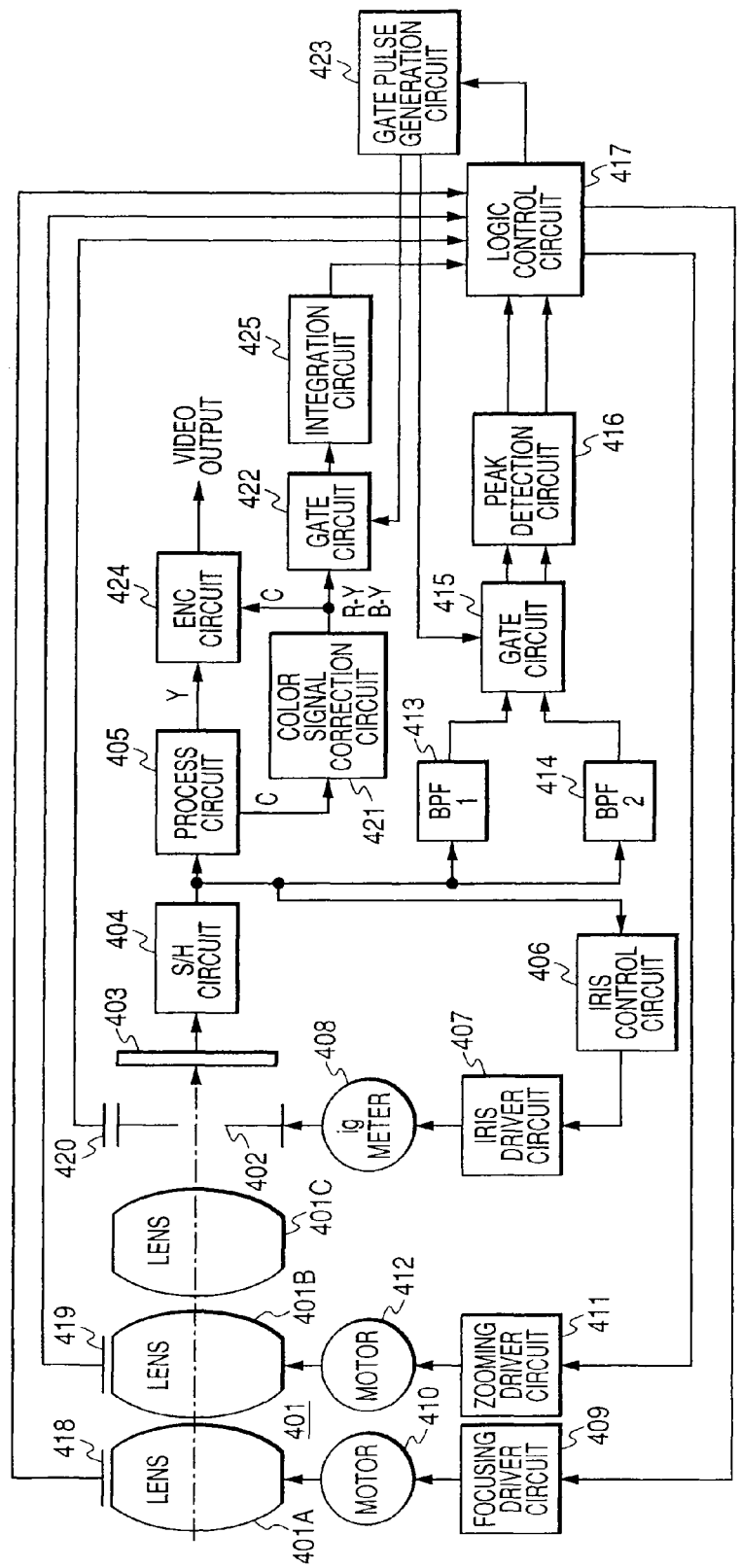
FIG. 9 is a block diagram showing the case that the solid-state image pickup device of the present invention is applied to a video camera.

FIG. 9 is a block diagram showing the case that the solid-state image pickup device of the present invention is applied to a video camera, and an image pickup lens 401 is provided with a focus lens 401A for adjusting a focus, a zoom lens 401B which performs zooming operation, and a lens 401C for imaging.

Moreover, the figure shows a diaphragm 402, a solid state image pickup element (solid-state image pickup device) 403 which performs the photoelectric conversion of an object image, which is imaged on an imaging plane, into an electric imaging signal, and a sample/hold circuit (S/H circuit) 404 which performs the sample/hold of the imaging signal outputted from the solid state image pickup element 403, further, amplifies a level, and outputs a picture signal.

A process circuit 405 which performs the predetermined processing such as gamma correction, color separation, and blanking processing to the picture signal outputted from the sample/hold circuit 404 outputs a luminance signal Y and a chroma signal C. The chroma signal C outputted from the process circuit 405 is given white balance and color balance in a color signal correction circuit 421, and is outputted as color-difference signals R-Y and B-Y.

In addition, the luminance signal Y outputted from the process circuit 405 and the color-difference signals R-Y and B-Y outputted from the color signal correction circuit 421 are modulated in an encoder circuit (ENC circuit) 424, and is outputted as a standard television signal. Then, the signal is supplied to a VCR or a monitor EVF such as an electronic viewfinder, which is not shown.

Next, an iris control circuit 406 controls an iris drive circuit 407 on the basis of the picture signal supplied from the sample/hold circuit 404, and automatically controls an ig meter so as to control the opening amount of the diaphragm 402 so that a level of the picture signal may become a constant value at a predetermined level. Band pass filters (BPF) 413 and 414 having different pass bands extract high frequency components necessary for performing focusing detection from the picture signal outputted from the sample/hold circuit 404. Signals outputted from a first band pass filter 413 (BPF1) and a second band pass filter 414 (BPF2) are gated respectively by a gate circuit 415 with a focus gate frame signal, and is inputted into a logic control circuit 417 with a peak value being detected and held in a peak detection circuit 416.

This signal is called a focus voltage, and a focus is adjusted with this focus voltage. In addition, other relating units are a focal encoder 418 which detects a moving position of the focus lens 401A, a zoom encoder 419 which detects the focal length of the zoom lens 401B, and an iris encoder 420 which detects the opening amount of the diaphragm 402. Detection values of these encoders are supplied to the logic control circuit 417 which performs system control. The logic control circuit 417 performs focus detection to an object on the basis of the picture signal corresponding to a set focus detection region, and adjusts a focus. Thus, the logic control circuit 417 fetches the information of peak values of high frequency components supplied from respective band pass filters 413 and 414, supplies control signals of a rotation direction, rotational speed, rotation/stop, and the like of a focus motor 410 to the focusing driver circuit 409 so as to drive the focus lens 401A to a position where the peak values of high frequency components become maximum, and controls this.

The present invention is applied to a solid-state image pickup device in which a plurality of pixels are arranged two-dimensionally, and has means of reading a signal which is given photoelectric conversion by a pixel, and is used suitably for a digital camera (still camera) corresponding to moving images, a digital video camera, and the like.

This application claims priority from Japanese Patent Application No. 2004-150538 filed May 20, 2004, which is hereby incorporated by reference herein.

What is claimed is:

1. A solid-state image pickup device comprising:
   a plurality of pixels which are arranged two-dimensionally and output pixel signals derived by photoelectric conversion;

a plurality of output lines each coupled to a respective line of said pixels, and each of which transmits the pixel signals output from said pixels arranged in one line;

a plurality of variable gain amplifiers each coupled to a respective one of said output lines, each comprising (a) a differential amplifier, (b) a first coupling capacitor connecting said output line and one input terminal of said differential amplifier, which removes noise of the pixel signal or signals received thereby, and (c) a second coupling capacitor connecting said one input terminal and an output terminal of said differential amplifier, wherein the gain of each of said plurality of variable gain amplifiers is determined by the ratio of capacitor values of said first coupling capacitor and said second coupling capacitor, wherein said solid-state image pickup device operates in a first mode of reading the output signal from every pixel, and a second mode of reading and adding the output signals from the plurality of pixels, wherein the gain of each of said variable gain amplifiers is higher in the second mode than in the first mode, wherein said plurality of pixels are provided with color filters, such that, in the second mode, the output signals read out from said pixels having the color filter of the same color are added, and wherein said solid-state image pickup device further comprises an adder circuit comprising a plurality of capacitive elements each holding an output from a respective one of said differential amplifiers, and being arranged such that different ones of said capacitive elements share the same input and output terminal selectively connected in the second mode.

2. The solid state image pickup device according to claim 1, wherein the first mode is a still image readout operation mode, and the second mode is a moving image readout mode.

3. A camera comprising:
the solid state image pickup device according to claim 1;
an optical system which images light on the solid state image pickup device; and
a signal processing circuit which processes an output signal from the solid state image pickup device.

4. The solid state image pickup device according to claim 1, further comprising an output circuit including:
a first storage capacitor storing the pixel signal and an offset of said variable gain amplifier;
a second storage capacitor storing the offset of said variable gain amplifier; and
a differential amplifier removing, from signal stored in said first storage capacitor, the offset signal stored in said first storage capacitor to output the pixel signal.

5. A solid state image pickup device comprising:
a plurality of pixels arranged in a matrix;
a plurality of noise reduction circuits each arranged in correspondence to a respective column of the matrix, and each reducing noise generated by the pixels;
a plurality of variable gain amplifiers, each arranged in correspondence to a respective one of the noise reduction circuits, and each amplifying signals output from a corresponding one of the noise reduction circuits; and
an adder circuit for adding signals amplified by the variable gain amplifiers, wherein the solid-state image pickup device operates in a first mode of reading the output signal from every pixel, and a second mode of reading and adding the signals by the adder circuit, wherein the gain of each of the variable gain amplifiers is higher in the second mode than in the first mode, wherein the adder circuit comprises a plurality of capacitive elements each holding a signal output from a corresponding one of the variable gain amplifiers, and being arranged such that different ones of said capacitive elements share the same input and output terminal selectively connected in the second mode.

6. A solid state image pickup device according to claim 5, wherein said plurality of pixels are provided with color filters, such that, in the second mode, the output signals read out from said pixels having the color filter of the same color are added.

* * * * *